(12) United States Patent
Kahlenberg et al.

(10) Patent No.: US 7,258,365 B2
(45) Date of Patent: Aug. 21, 2007

(54) STEERING COLUMN ARRANGEMENT FOR A MOTOR VEHICLE

(75) Inventors: Matthias Kahlenberg, Boeblingen (DE); Karl-Heinz Knoll, Weinstadt (DE); Juergen Niemoeller, Sindelfingen (DE); Franz Rauner, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 158 days.

(21) Appl. No.: 10/355,241

(22) Filed: Jan. 31, 2003

(65) Prior Publication Data

US 2003/0160440 A1    Aug. 28, 2003

(30) Foreign Application Priority Data

Jan. 31, 2002    (DE) ................. 102 03 917

(51) Int. Cl.
*B62D 1/18* (2006.01)
(52) U.S. Cl. ..................................... 280/775
(58) Field of Classification Search ............... 280/775, 280/777; 74/492, 493
See application file for complete search history.

(56) References Cited

U.S. PATENT DOCUMENTS 4,901,593 A * 2/1990 Ishikawa .................... 74/493
5,449,199 A * 9/1995 Heinrichs et al. .......... 280/775
5,690,362 A   11/1997 Peitsmeier et al.
6,264,239 B1   7/2001 Link

FOREIGN PATENT DOCUMENTS

| DE | 3544345 A1 * | 7/1986 |
| DE | 4030405 | 4/1992 |
| DE | 195 24 196 | 11/1996 |
| DE | 19524196 | 11/1996 |
| DE | 198 12 179 | 8/1999 |
| DE | 19812179 | 8/1999 |
| GB | 1445895 | 8/1974 |
| JP | 5-58952 | 8/1993 |
| JP | 9-501359 | 2/1997 |

* cited by examiner

*Primary Examiner*—Faye M. Fleming
(74) *Attorney, Agent, or Firm*—Crowell & Moring LLP

(57) ABSTRACT

A steering column arrangement has an outer jacket tube as well as an inner jacket tube, which is displaceable within the former, as well as an adjusting device effective between the two jacket tubes for displacing one jacket tube in relation to the other jacket tube. The adjusting device comprises a drive unit and a servo component. The drive unit should be releasably fastened to a guiding device, and the drive unit should be mounted in a fashion permitting displacement along the guiding device.

17 Claims, 1 Drawing Sheet

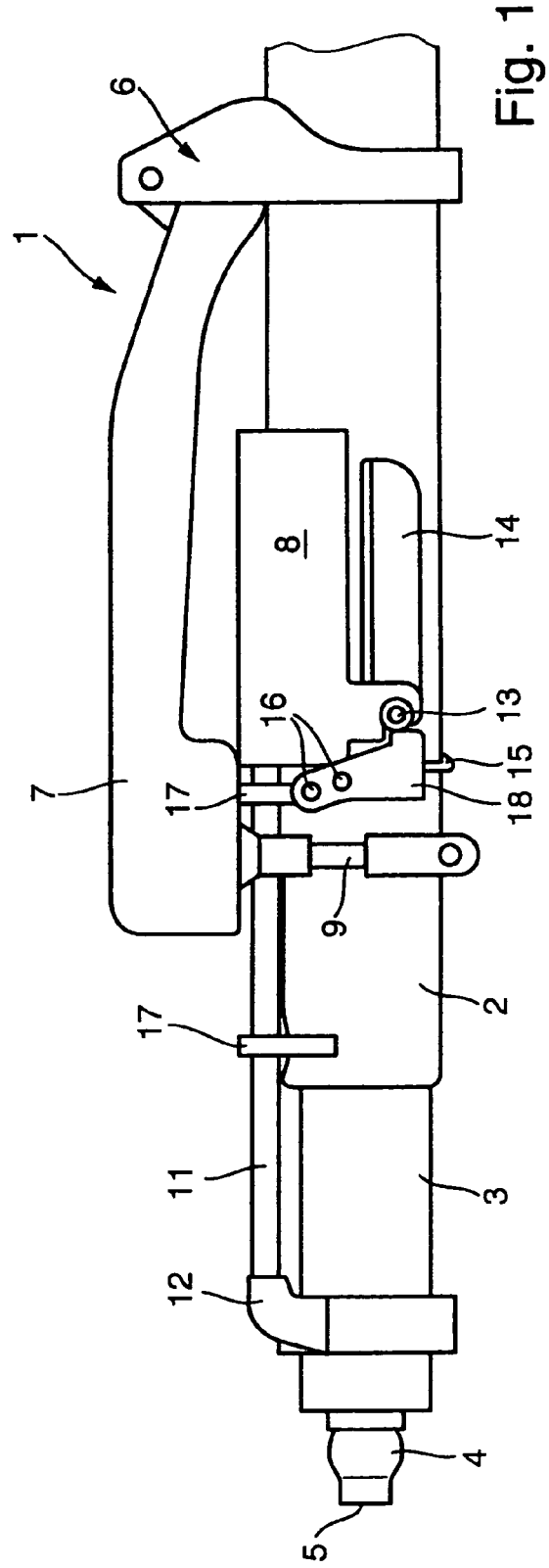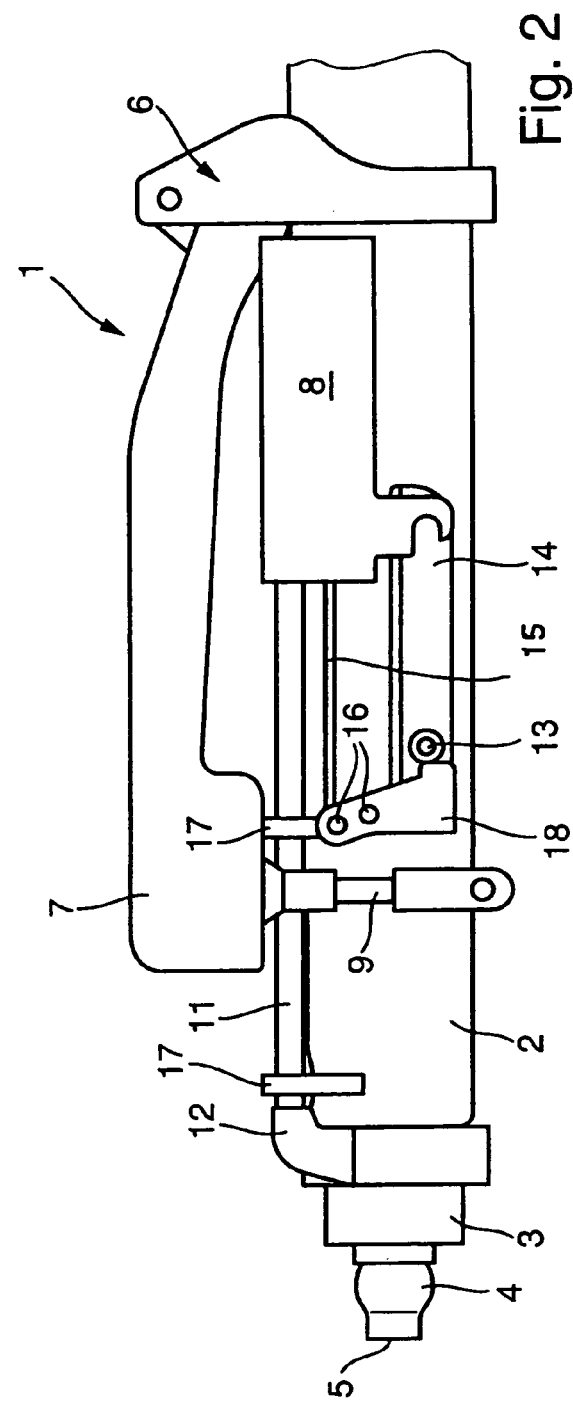

STEERING COLUMN ARRANGEMENT FOR A MOTOR VEHICLE

BACKGROUND AND SUMMARY OF THE INVENTION

This application claims the priority of German Patent Document 102 03 917.8, filed on Jan. 31, 2002, the disclosure of which is expressly incorporated by reference herein.

The invention relates to a steering column arrangement for a motor vehicle comprising an outer jacket tube, an inner jacket tube being displaceable within the outer jacket tube, and an adjusting device effective between the two jacket tubes for displacing one jacket tube in relation to the other jacket tube, the adjusting device comprising a drive unit and a servo component.

German Patent Document DE 195 24 196 C1 (corresponding to U.S. Pat. No. 5,690,362) discloses such a steering column arrangement. The known steering column arrangement has a steering spindle which supports a steering wheel and is mounted movably in terms of rotation in an inner jacket tube. The inner jacket tube is mounted inside an outer jacket tube in a telescopically displaceable fashion, the outer jacket tube being secured to the body support structure of the motor vehicle. An adjusting device is incorporated for displacing the inner jacket tube in relation to the outer jacket tube, said adjusting device being formed as a servo component taking the form of a spindle drive and being actuated by an electric motor. The spindle drive has a positioning spindle whose axis is parallel to the steering axis of the steering spindle and which runs along the outside of the outer and inner jacket tube, said spindle drive being positionally fixed on the inner jacket tube at one end face by means of a mounting. In the region of the outer jacket tube a threaded nut which is mounted between two energy-absorbing bearing blocks is seated on the positioning spindle which is formed as a threaded spindle. The electric positioning motor acts on the threaded nut via a corresponding toothed gearing. In the event of an impact load on the motor vehicle, additional impact energy can be absorbed in the region of the adjusting device by plastic deformation of the energy-absorbing bearing blocks through the introduction of forces through the adjusting spindle.

German Patent Document DE 198 12 179 C1 (corresponding to U.S. Pat. No. 6,264,239) discloses a further steering column arrangement, in which impact energy is absorbed by the adjusting device. This arrangement differs from the one described above in that the servo component running along the steering column axis is provided with a designated folding point, and in that a support bracket is provided at the height of the designated folding point, said support bracket being arranged in a positionally fixed manner on the inner jacket tube, extending at least partially over the designated folding point and being designed in a fashion permitting plastic deformation.

An aspect of the present invention is to create a steering column arrangement of the type described above, said steering column arrangement realizing a different principle of a safety steering column, in which impact energy is absorbed in the region of the adjusting device.

This aspect may be achieved in that the drive unit is releasably fastened to a guiding device and in that the drive unite is mounted so as to be displaceable along the guiding device.

According to this arrangement, the energy absorption does not take place in the region of the servo component of the adjusting device, but rather in the region of the drive unit of the latter. To this end the drive unit is releasably fastened to a guiding device, along which guiding device the drive unit is displaceably mounted under absorption of energy. This has the advantage that the absorption of energy occurs in conjunction with a defined motion of the drive unit along the guiding device. With this, the direction of motion is uniquely defined by the guiding device and is therefore predeterminable. Furthermore, as the energy absorption takes place during the motion of the drive unit in relation to the guiding device, i.e. during a defined motion, the extent and the profile of the energy absorption can be set particularly easily and accurately.

The guiding device can be assigned to a jacket tube, for example the outer jacket tube. The outer jacket tube is usually arranged fixed to the vehicle. This design has particular advantages for manufacturing, as it enables simple assembly of the guiding device on the jacket tube, as the latter is easily accessible. It is, of course, also conceivable for the guiding device to be assigned to a different vehicle component. The requirement is that this component does not move if a force is brought to bear on the steering column arrangement, said component being instead arranged in a positionally fixed fashion with regard to the vehicle.

According to one embodiment, the guiding device comprises at least one rail, the latter being aligned in the longitudinal direction of the steering column arrangement. The alignment in the longitudinal direction has the advantage that the drive unit also moves in a defined fashion in the longitudinal direction of the steering column arrangement. A guiding device which permits a motion of the drive unit in a different direction is also conceivable, but this would require greater build space.

For reasons of cost it is advantageous to have the guiding device and the jacket tube formed as a single part, as in this case the cost and effort of attaching the guiding device to the jacket tube are saved. Of course, an embodiment comprising a plurality of parts is also conceivable.

The drive unit can have receptacles assigned to the guiding configured. By way of the design of these receptacles, it is possible to define the resistance force opposing a displacement of the drive unit along the guiding device. In other words, by way of the receptacles it is possible to influence the extent of the energy absorption in a particularly simple manner.

The attachment of the drive unit to the guiding device can be configured in such a way that failure of the attachment occurs if a predetermined level of force being brought to bear on the steering column arrangement is exceeded. This embodiment represents a particularly simple way of activating the displacement of the drive unit and a simple way of activating the energy absorption. It is also conceivable for the attachment to be released depending on values measured by sensors, for example certain acceleration values.

Furthermore, it is also conceivable to assign an additional energy absorption element to the drive unit, which additional energy absorption element is then also activated if the drive unit is displaced in relation to the guiding device. In this way the extent of the energy absorption can be increased again. Depending on the type of energy absorption element chosen, the profile of the energy absorption can also be accurately set.

A metal element can be used, for example, as the energy absorption element, said metal element absorbing energy while being deformed. Such energy absorption elements are sufficiently well known and have the advantage that their deformation behavior and the energy required for and absorbed during the deformation process can be calculated with a high degree of accuracy. In this way, the extent of the energy absorption can be very accurately predetermined or set.

The energy absorption element can, for example, comprise a wire. A wire takes up little space, which is advantageous in terms of build space. It is furthermore conceivable to attach one end of the wire to the drive unit, so that a force is brought to bear on the wire at the moment when the drive unit starts to move. If the wire is routed around an obstacle, the wire is pulled around the latter at the moment when the force is brought to bear on the wire, and the wire deforms in the process. Energy is dissipated by this deformation. The profile and the extent of the energy absorption can be very easily set by the material and dimensions (cross section) of the wire.

Other objects, advantages and novel features of the present invention will become apparent from the following detailed description of the invention when considered in conjunction with the accompanying drawings.

BRIEF DESCRIPTION OF THE DRAWINGS

FIG. 1 shows a steering column arrangement having a drive unit according to the invention before a crash, and FIG. 2 shows a steering column arrangement according to FIG. 1 after a crash.

DETAILED DESCRIPTION OF THE DRAWINGS

In FIG. 1 shows a steering column arrangement 1 having an outer jacket tube 2 and an inner jacket tube 3. A steering spindle 4 is arranged coaxially and mounted rotatably in the jacket tubes 2 and 3. At the end of said steering spindle 4 protruding from the inner jacket tube 3 there is a connection 5 for a steering wheel (not illustrated here). At the end of the steering column arrangement 6 opposite the connection 5, the outer jacket tube 2 is attached by way of a joint on to a console 7 which is in turn arranged fixed to the vehicle.

The illustrated steering column arrangement 1 is a steering column which is adjustable for comfort purposes. The drive for the comfort adjustment is effected via drive units which interact with servo components in the form of threaded spindles, the manner of said interaction being conventional in the prior art. To this end a threaded spindle 9 is incorporated for the height adjustment. The threaded spindle 9 is driven by a motor/gearing unit (not illustrated here). The spindle 9 is attached by way of a joint on to the console 7 and engages in the outer jacket tube 2. The threaded spindle 9 plays no role in conjunction with the present invention.

A further threaded spindle 11 is incorporated for the longitudinal adjustment, said threaded spindle 11 engaging on the inner jacket tube 3 via a bracket 12 and on the part of the steering spindle 4 protruding from the inner jacket tube 3. The spindle 9 is driven by the motor/gearing unit 8. Both the steering spindle 4 and the jacket tube comprising the inner and outer jacket tubes 2 and 3 are of telescopic design. In the event of a change in the length of the steering column arrangement, the inner jacket tube 3 therefore moves in the outer jacket tube 2.

A guiding device is assigned to the motor/gearing unit 8 in the form of the guiding surfaces 14. A guiding surface 14 is shown in FIG. 1. A corresponding guiding surface is provided on the other side of the motor/gearing unit 8—covered here by the steering column arrangement 1. The motor/gearing unit 8 is connected to the outer jacket tube 2 by attachment elements 13 which are arranged on the guiding surfaces 14. They engage in a special recess in the motor/gearing unit, said recess enabling the motor/gearing unit 8 to be displaced out from the attachment. The recess in the form of a bore has an opening for this purpose oriented in the opposite direction to the direction of displacement. The bore can also be formed in a closed fashion, tearing open in the event of a force being brought to bear.

Guiding eyelets 17 through which the threaded spindle 11 is guided are also incorporated. The guiding eyelets 17 are positioned on the outer jacket tube 2 and have recesses to receive and guide the threaded spindle 11.

A wire 15 is attached to the motor/gearing unit 8, and is routed in FIG. 1 behind a fixture 18 and around two pins 16. The rest of the wire 15 is routed down around the jacket tube. This can be seen in FIG. 1. This remaining wire forms a supply of wire for the energy absorption process.

If, in the event of a crash, a force is brought to bear onto the steering column arrangement 1 in the direction of the arrow A, and if this force exceeds a certain pre-determined extent, this force is transmitted via the steering wheel (not shown here) and the steering spindle 4 onto the inner jacket tube 3, and from there on to the threaded spindle 11. The threaded spindle 11 in turn transmits the force A on to the motor/gearing unit 8. As a result, the force acts on the attachment point 13 which is designed in such a way that failure of the attachment occurs if a pre-determined force is exceeded. As soon as the attachments 13 have been released, the force causes the motor/gearing unit 8 to be displaced along the guiding surfaces 14. The inner jacket tube 3 and the steering spindle 4 with the steering wheel (not illustrated) are also displaced together with the motor/gearing unit 8 and the threaded spindle 11 connected to the former. The guiding eyelets 17 offer additional guidance via the threaded spindle 11 to the components displaced as a result of the force brought to bear.

Friction needs to be overcome in order to displace the motor/gearing unit 8 along the guiding surfaces 14. Depending on the size of this friction, more or less energy is expended—i.e. absorbed—in order to displace the motor/gearing unit 8 along the guiding surfaces 14. The wire 15 is provided with the object of increasing the energy absorption. It is also conceivable that the energy absorption could take place by way of the wire 15 alone. As soon as the displacement of the motor/gearing unit 8 commences, a part of the force A is introduced into the wire 15, causing the latter to be pulled around the pin 16, around which the wire 15 is routed. During this motion the wire 15 is deformed. Energy is also dissipated in this deformation. If wire with a constant diameter is used, then the level of force of the energy absorbed during the motion of the motor/gearing unit is constant, to be precise along the entire path. The diameter of the wire represents a simple way of influencing the extent of energy absorption and the profile of the latter along the path. In this way, the energy absorption can already be set in advance in a particularly simple fashion by way of the properties of the wire 15.

A further advantage of the invention should be seen in the fact that the motion of the motor/gearing unit 8 is guided by the guiding surfaces 14 and therefore takes place in a defined fashion. This makes it possible to predetermine the required build space and movement space very accurately.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering column arrangement, comprising:
   an outer jacket tube,
   an inner jacket tube being displaceable within the outer jacket tube,
   an adjusting device effective between the two jacket tubes for displacing one jacket tube in relation to the other jacket tube, said adjusting device comprising a drive unit and a servo component, and
   an energy absorption element assigned to the drive unit,
   wherein the drive unit is releasably fastened to a guiding device,
   wherein the drive unit is mounted so as to be displaceable along the guiding device along a predetermined path, and
   wherein the energy absorption element is arranged to absorb energy essentially constantly during displacement of the jacket tubes relative to one another.

2. Steering column arrangement according to claim 1, wherein the guiding device is assigned to a jacket tube.

3. Steering column arrangement according to claim 1, wherein the guiding device is assigned to the outer jacket tube.

4. Steering column arrangement according to claim 1, wherein the guiding device comprises at least one rail which is oriented in a longitudinal direction of the steering column arrangement.

5. Steering column arrangement according to claim 2, wherein the guiding device comprises at least one rail which is oriented in a longitudinal direction of the steering column arrangement.

6. Steering column arrangement according to claim 1, wherein the guiding device is formed as a single part with the outer jacket tube.

7. Steering column arrangement according to claim 1, wherein the drive unit has receptacles assigned to the guiding device.

8. Steering column arrangement according to claim 1, wherein attachment of the drive unit on the guiding device is designed in such a way that failure of the attachment occurs if a force is brought to bear on the steering column arrangement in excess of a predetermined amount.

9. Steering column arrangement according to claim 1, wherein guiding elements are assigned to the servo component.

10. Steering column arrangement according to claim 1, wherein the energy absorption element is made of metal which absorbs energy under deformation.

11. Steering column arrangement according to claim 1, wherein the energy absorption element is made of wire.

12. Steering column arrangement according to claim 10, wherein the energy absorption element is made of wire.

13. Steering column arrangement according to claim 11, wherein one end of the wire is attached to the drive unit.

14. Steering column arrangement according to claim 11, wherein the wire is routed around a plurality of pins.

15. A method of making a steering column arrangement comprising making the steering column arrangement of claim 1.

16. A method of using a steering column arrangement comprising utilizing the steering column arrangement of claim 1.

17. A steering column assembly comprising:
   an outer jacket tube,
   an inner jacket tube,
   an adjuster for relatively displacing the two tubes, the adjuster having a drive unit and a servo component, and
   an energy absorption element assigned to the drive unit,
   wherein the drive unit is releasably fastened to a guiding device so that impact energy is operatively absorbed by the energy absorption element along a predetermined path in a region of the drive unit essentially constantly during displacement of the jacket tubes relative to one another.

* * * * *